Feb. 22, 1927. 1,618,646
A. B. FISHER
TIRE FOR ROCKERS
Filed April 16, 1924
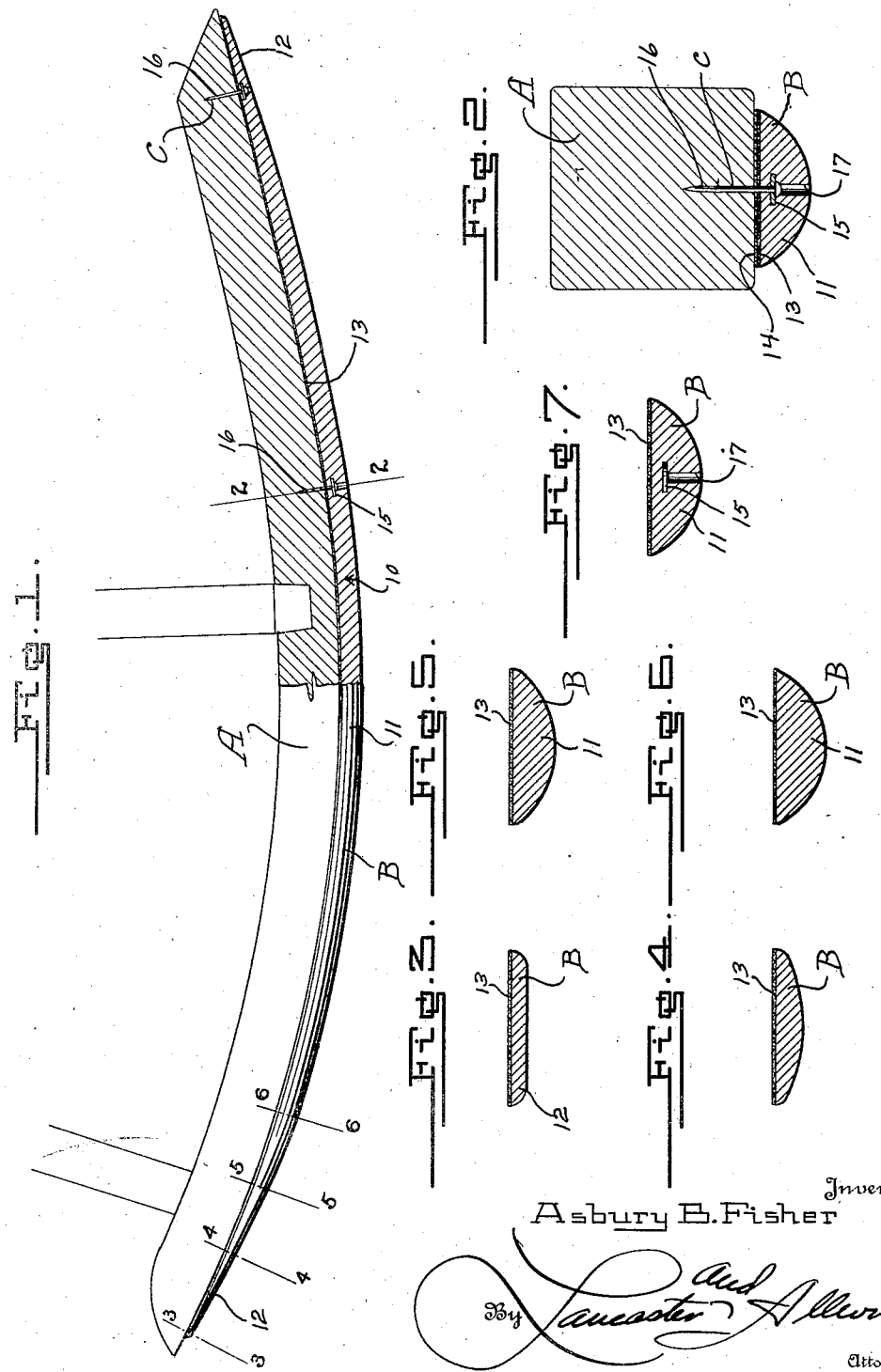

Patented Feb. 22, 1927.

1,618,646

UNITED STATES PATENT OFFICE.

ASBURY B. FISHER, OF ANDERSON, INDIANA.

TIRE FOR ROCKERS.

Application filed April 16, 1924. Serial No. 706,948.

The present invention relates to rocking chairs, cribs or the like, and more specifically to attachments for the rockers thereof.

The primary object of the invention is to provide a resilient tire for rockers, which will prevent the rockers from marring the floor or carpet with which they come in contact, and also afford comfort to the user as when rocking upon an uneven floor surface.

Another object of the invention is to provide a resilient tire adapted for attachment to the lower side of the rocker, and so constructed as to not detract from the general appearance of the rocker when applied thereto.

A still further object of the invention is to provide a rubber tire for rockers, being so constructed as to be relatively heavier at the point where most wear will come thereupon when in use.

Other objects and advantages of the invention will appear in the following detailed description, taken in connection with the accompanying drawing, forming a part of this specification, and in which drawing, Figure 1 is a view partly in side elevation, and partly in vertical longitudinal section, through a rocker embodying my improved tire.

Figure 2 is an enlarged transverse section on the line 2—2 of Figure 1, and showing the method of attaching the tire to the rocker.

Figures 3, 4, 5 and 6 are enlarged transverse sections on the lines 3—3; 4—4; 5—5, and 6—6 respectively of Figure 1, through the tire only.

Figure 7 is an enlarged transverse section through the tire at a point where one of the attaching elements will pass.

Referring to the drawing in detail, and wherein similar characters designate corresponding parts throughout the several views; A designates a rocker, and B an improved tire adapted for attachment to the lower cambered surface of the rocker as by means C.

The tire B which may be moulded of rubber or any desirable resilient material, preferably consists of an elongated body 10 being segmental shaped in cross section throughout the major portion of its length, and intermediate its end portions. The convex outer surface of the segmental shaped central portion 11, recedes in both directions from the longitudinal center of the body to a substantially flat outer surface at each end portion 12 of the body, as clearly shown in Figure 3. By so forming the tire B with relatively flat end portions, and a substantially heavier central portion, it can be seen that the flat end portions will be practically concealed from view, while the relatively heavier central portion will provide a substantial cushion at the central portion of the rocker and at a point which will be subjected to the most wear. A fabric reinforcing strip 13 is preferably positioned at the inner flat surface of the body 10, during the moulding process, and extends throughout the entire length of the body for preventing stretching or shrinking of the tire when applied to the rocker. This fabric 13 will also aid in applying the tires to rockers, by presenting a roughened surface for adhering to the cement 14 which aids in retaining the tires in position upon the lower surface of the rockers.

The attaching means C consists of metallic washers 15 which are embedded in the body 10, at intervals throughout its entire length, and through which nails or tacks 16 may be driven into the rocker A, with the heads thereof engaging the embedded washers. Openings or slots 17 which are in axial alignment with the openings in the washers 15, and which open at the outer surface of the body 10, are for aiding in locating the washers when attaching the tires to the rockers.

It will be seen that a novel and well designed tire for rockers has been provided embodying good mechanical, as well as appearing features, tires which may be easily attached to the lower cambered surface of the rockers, and tires or cushions which may be manufactured at a relatively low cost and therefore appeal to the purchasing public.

Various minor changes may be made without departing from the spirit or scope of the invention; but,

I claim:

1. A resilient tire for rockers having flat lower cambered surfaces comprising an elongated solid body of substantial segmental shape in cross section throughout the central portion of its length and gradually reduced in thickness towards each end and having its convex outer surface gradually merging into a substantially flat outer surface toward each end portion of the body.

2. As an article of manufacture, a tire for attachment to the cambered lower flat surface of a rocker, comprising an elongated solid resilient body of substantially segmental shape in cross section thruout the intermediate portion of its length, gradually reduced in thickness toward each end, and having its outer convex surface gradually merging into a substantially flat outer surface toward each end of the body, and an inelastic fabric strip embedded in the upper flat surface of the body, extending thruout the entire length thereof and presenting a roughened surface for engagement with the rocker bottom.

ASBURY B. FISHER.